Figure 24:
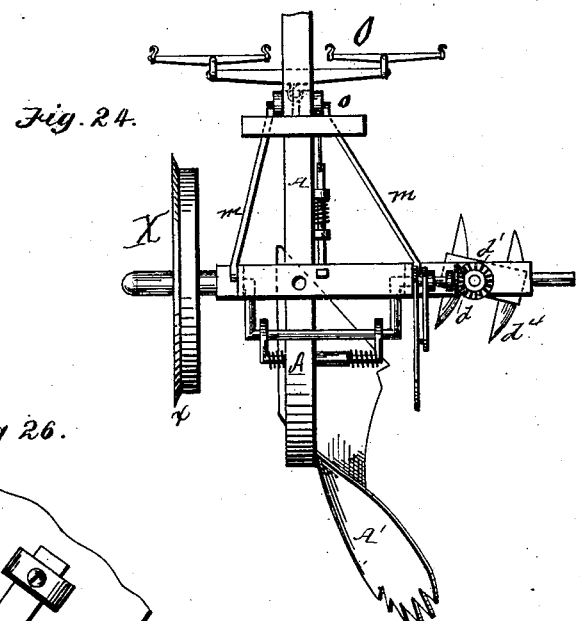

(No Model.) 6 Sheets—Sheet 1.
T. E. JEFFERSON.
Plow.
No. 243,570. Patented June 28, 1881.
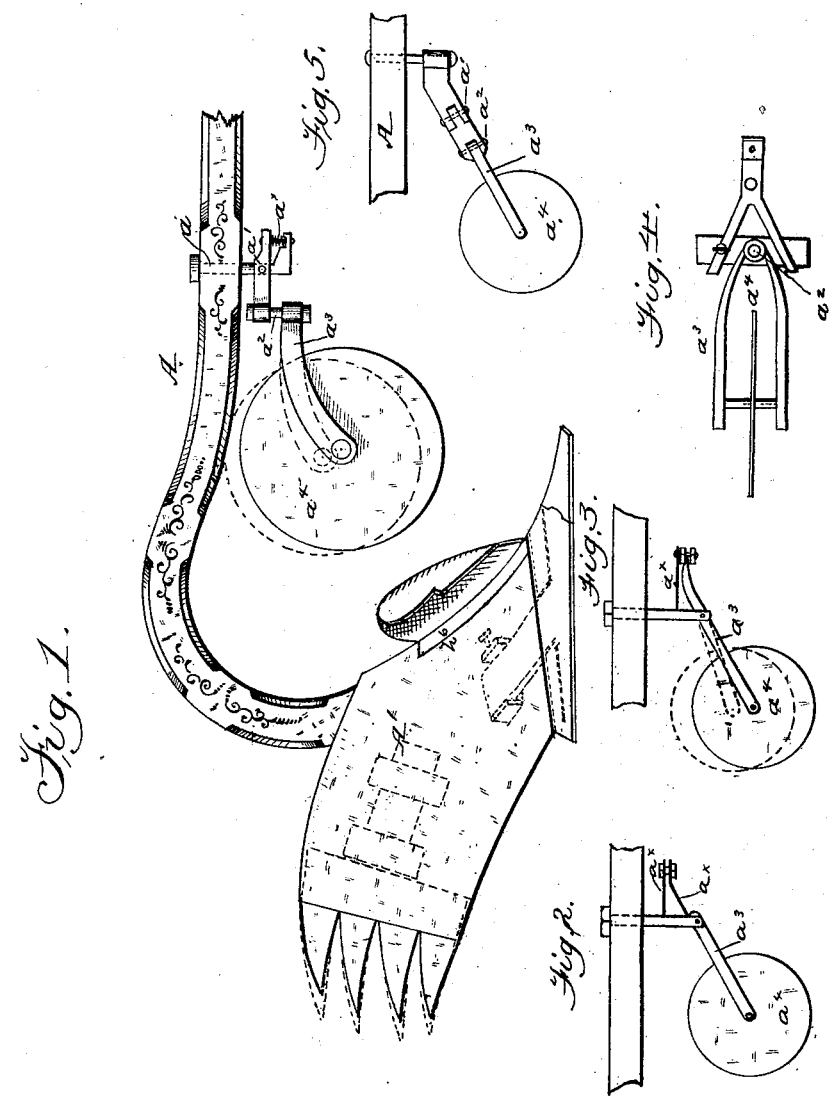
Witnesses;
Walter Fowler
A. Clay Smith
Inventor;
Thos. E. Jefferson (No Model.) 6 Sheets—Sheet 2.
T. E. JEFFERSON.
Plow.
No. 243,570. Patented June 28, 1881.
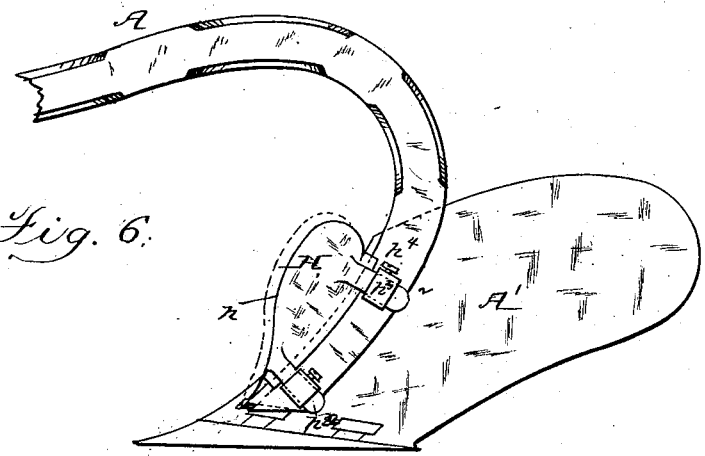
Fig. 6.
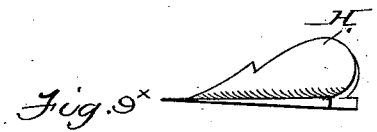
Fig. 7.
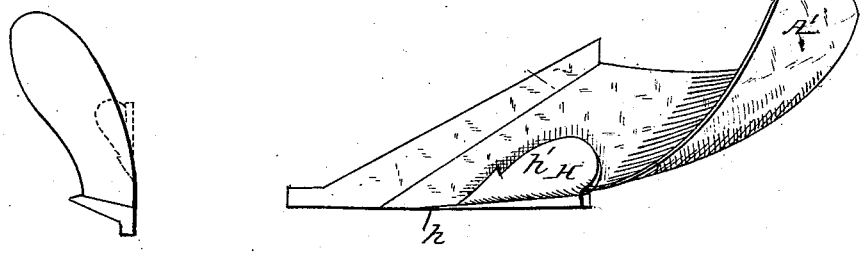
Fig. 9ˣ. Fig. 8.
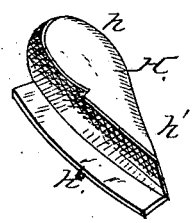
Fig. 9.
Witnesses:
Walter Fowler,
H. Clay Smith
Inventor:
Thos. E. Jefferson (No Model.)  6 Sheets—Sheet 3.
T. E. JEFFERSON.
Plow.
No. 243,570.  Patented June 28, 1881.
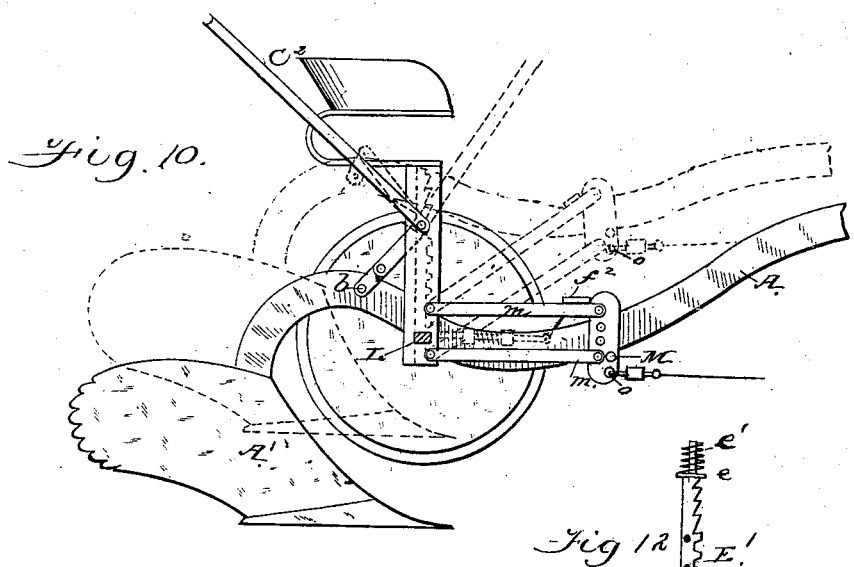
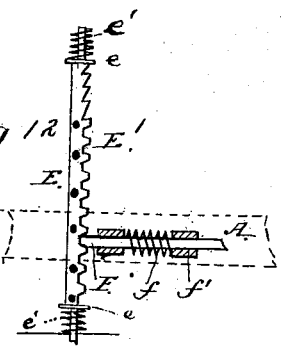
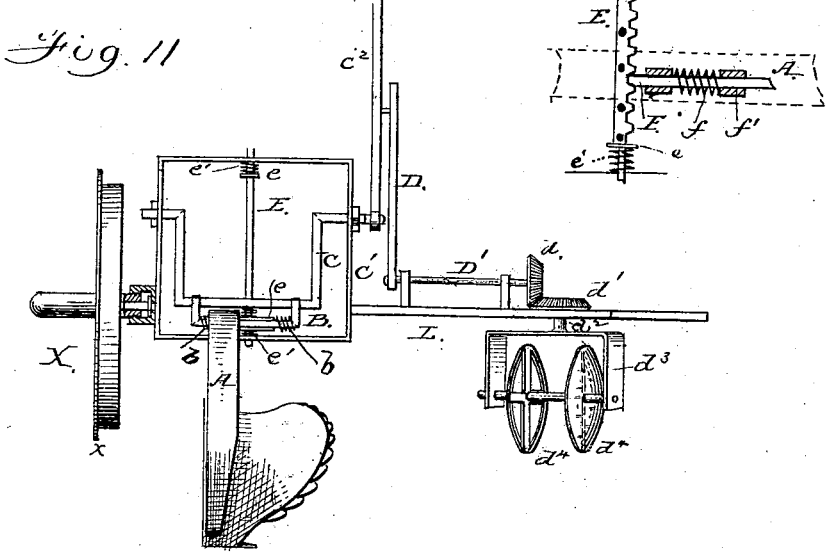
Witnesses:
Walter Fowler
H. Clay Smith
Inventor:
Thos E Jefferson

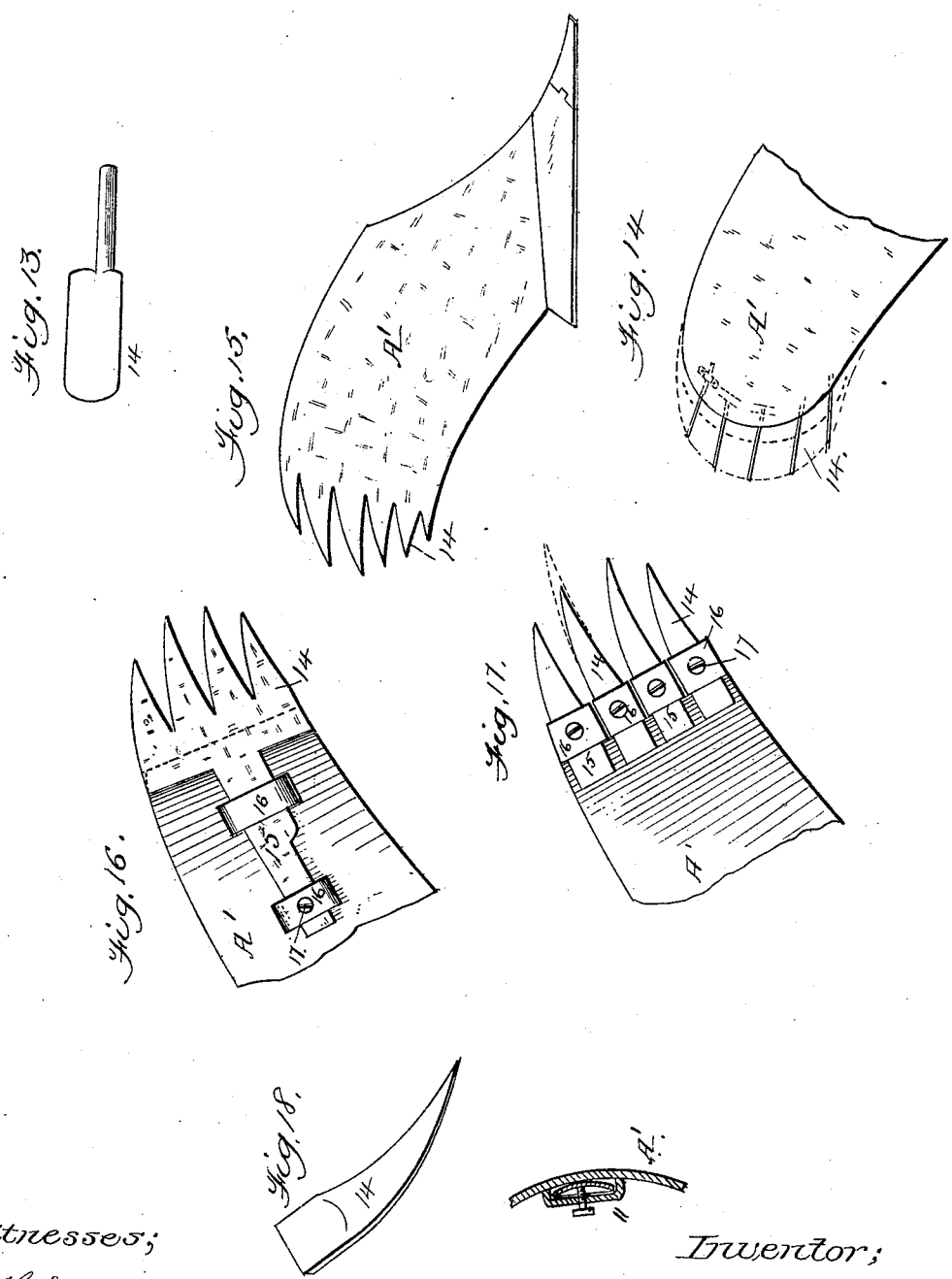

(No Model.) 6 Sheets—Sheet 5.
T. E. JEFFERSON.
Plow.
No. 243,570. Patented June 28, 1881.
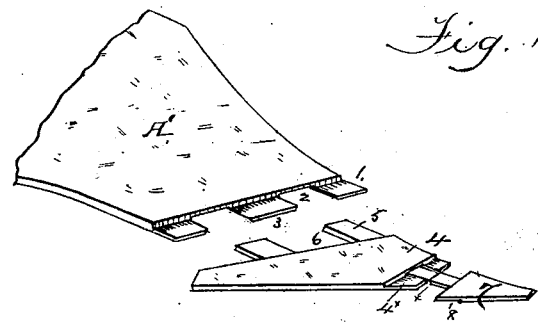
Fig. 19.
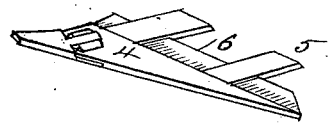
Fig. 20.
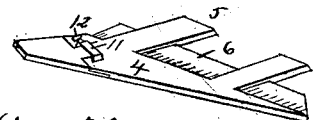
Fig. 21.
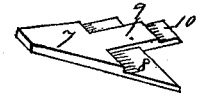
Fig. 22.
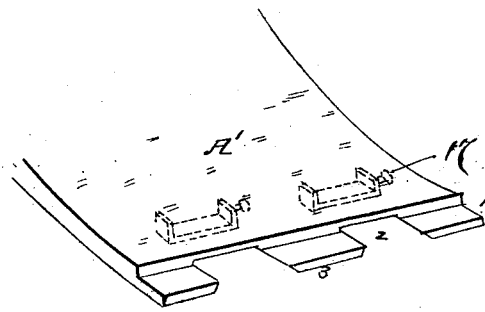
Fig. 23.
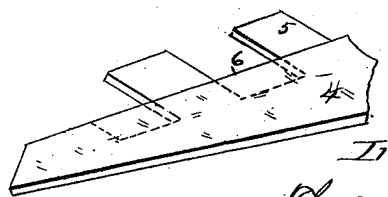
Witnesses:
Walter Fowler
H. Clay Smith
Inventor:
Thos. E. Jefferson (No Model.) 6 Sheets—Sheet 6.

T. E. JEFFERSON.
Plow.

No. 243,570. Patented June 28, 1881.

Witnesses:
W. H. H. Knight
R. Clay Smith

Inventor,
Thos. E. Jefferson

UNITED STATES PATENT OFFICE.

THOMAS E. JEFFERSON, OF BOSTON, MASSACHUSETTS.

PLOW.

SPECIFICATION forming part of Letters Patent No. 243,570, dated June 28, 1881.

Application filed April 22, 1881. (No model.)

*To all whom it may concern:*

Be it known that I, THOMAS E. JEFFERSON, of Boston, in the county of Suffolk and State of Massachusetts, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification.

My invention relates to a plow for ordinary and customary agricultural purposes; and the novelty consists in the construction and arrangement of parts, as will be more fully hereinafter set forth, and specifically pointed out in the claims.

The objects of the invention are, first, to provide an improvement in revolving pivoted spring cutting-colters secured to the beam of the plow and adapted to precede the share and mold-board in the line of travel; second, to provide a mold-board having means for pulverizing the soil being inverted, said means being operated to thus pulverize by the inverting force of the mold-board, and being approximately of the same curvature as the mold-board, and being susceptible of adjustment at will; third, to provide revolving pulverizing wheels or harrows, which are thrown in or out of inclined position as the plow is raised or lowered automatically; fourth, to provide a plow-point having cut-away portions and dovetailed arms which are adapted to fit into corresponding spaces in the mold-board, and an extreme point having a similar lip and arm adapted to fit into the plow-point and be secured thereto by a set-screw operating through a loop, the whole so jointed as to present an approximately even surface and approximately even transverse thickness; fifth, in an improved means for mounting a plow upon a sulky and for operating the same; sixth, to provide a riding-wheel having a cutting or holding flange which may be adjusted at will to serve several purposes, as will be explained.

To enable others skilled in the art to make and use my invention, I will describe the construction and operation of the same, reference being had to the accompanying drawings, which form a part of this specification, and in which—

Figure 26:
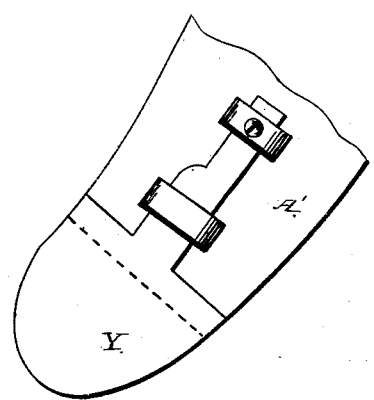
Figure 25:
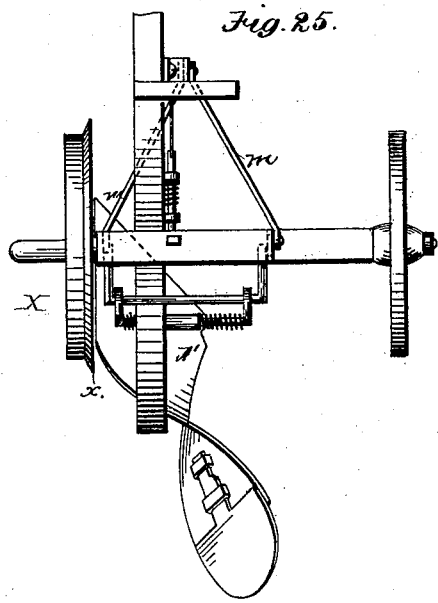
Figure 27:
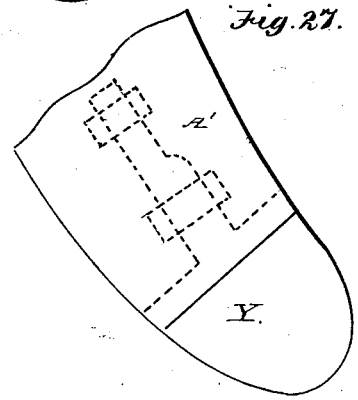

Figure 1 is a side elevation, showing my invention from the mold-board side and the swiveled spring-colter; Fig. 2, the swiveled revolving colter with a compound steel plate-spring; Fig. 3, a similar view with a single plate-spring, the colter-arm extending beyond the pivotal point and being secured to the spring-plate; Fig. 4, a top-plan view of the colter and its connections; Fig. 5, a side elevation of a modification; Fig. 6, a side elevation of the plow, beam, and attached colter-plow; Figs. 7 and 9, detached views of the colter-plow; Fig. 8, a top-plan view of the mold-board with the colter-plow attached. Fig. 10 is a side elevation, showing the means for elevating the plow when attached to a sulky; Fig. 11, a rear elevation, showing the automatic action between the plow-raising mechanism and the revolving harrows; Fig. 12, a detail view of the rack-bar and spring means for locking the beam in desired position; Figs. 13 and 14, removable knives secured to the mold-board; Fig. 15, a view of the mold-board having formed therein pulverizing-fingers; Fig. 16, the mold-board with the pulverizing-fingers removably secured thereto; Fig. 17, the mold-board with independent pulverizing-fingers removably secured; Fig. 18, a detail view of one of the teeth or fingers and the means for securing it, said finger being concavo-convex in transverse section; Fig. 19, a detail view of the removable point and extreme point; Figs. 20 and 21, detail views of the two points, showing different modes of attachment; Fig. 22, the extreme point as attached in Fig. 21; and Fig. 23, a detail view, showing the jointed portions beveled, upon an enlarged scale. Figs. 24 and 25 are top-plan views, and Figs. 26 and 27 are details.

Referring to the drawings, in which similar letters of reference indicate like parts in all the figures, A represents a plow-beam adapted to be used either in connection with a sulky, or otherwise, carrying the ordinary share and a peculiar mold-board, A', which will be hereinafter described. The beam is perforated at $a$ to receive a bracket, to which is pivoted a bar, $a'$, between one end of which and an arm of the bracket a spring, $a^x$, operates with a constant force to hold the said end of the bar $a'$ and the arm of the bracket apart.

Operating loosely in the bar $a'$ is a vertical headed rod, $a^2$, which is received in an eye at the junction of the bifurcated legs of a frame, $a^3$, between which is journaled a shaft carrying a revolving cutting-colter, as shown plainly in Fig. 1. By this construction it will be observed that the spring $a^x$ allows the colter $a^4$ to be elevated when it passes over obstructions, that the spring acts with a constant force to hold the colter in operating contact with the ground, and that the colter is so swiveled as to turn upon the bolt $a^2$ and accommodate itself to the curved line of travel as the plow is being turned, immediately resuming its position in front of the share as a new line of travel is taken.

In this construction the entire device is beneath the beam, and the important feature—the spring—may be modified or changed at will. For instance, I may employ double steel plate-springs, as shown in Fig. 2, allowing the bolt in the beam to turn loosely, or the single plate-spring, as shown in Fig. 3, and, if desired, the arm $a^3$ may be swiveled or pivoted, as shown in Fig. 5.

The mold-board is cut away, as shown at 1 in Fig. 19, to form a recess, and is provided with dovetailed recesses 2 upon its under side, and arms 3, having beveled edges, as shown in an enlarged scale in Fig. 23. A similar construction—that is, recesses 6 and arms 5 upon the plow-point 4—in an opposite direction allows the point to be secured to the mold-board $A'$, the portion 1 of the arms 3 resting upon the cut-away portion 1 of the arms 3, and the arms 5 engaging in the recesses 2, the beveled or dovetailed edges precluding the movement of the point in either direction, as is clearly shown in Figs. 19, 20, 21, 22, and 23 of the drawings.

Upon the under side of the point 4 is a socket and a recess formed or cast therein, and upon the point is a cut-away portion, as seen at 10. The toe or outer point, 7, is provided with a similar cut-away portion, 8, a dovetailed or beveled arm, 9, and a recessed extremity, 10. This extremity is received into the socket 11, and is held rigid by means of a set-screw, 12, as seen in Figs. 21 and 6 and Fig. 1.

It will be observed that these connecting and locking portions are so adapted to each other that the point is readily attached and locked to the mold-board and the outer point, 7, locked to the point 4, while at the same time the general surface may retain an approximately even contour, and the parts may have but a slightly-varying thickness, if any.

The rear portion of the mold-board $A'$ is provided with fingers 14, cast in one piece with the mold-board $A'$, or secured thereto, as shown in Figs. 14, 16, and 17. In Figs. 13 and 14 I show adjustable removable knives, which would be serviceable in heavy, tenacious, or clayey soil, while the fingers 14 shown in Figs. 15, 16, and 17 will operate efficiently in sandy loam or light soil. These fingers 14 are formed upon or secured to the mold-board in such a manner that their continuation may conform approximately to the curvature of the board, and by dispensing with the metal which would in an ordinary solid mold-board occupy the spaces between the fingers I am enabled to extend the mold-board farther back with the same amount of metal, thus giving a greater curvature to the mold-board, if needed, to insure the inversion of the soil with approximately the same amount of draft, and at the same time pulverize, cut, or disintegrate the soil.

It will be understood that the gist of this portion of my invention is to provide a device by which I am enabled to utilize the side pressure of a mold-board to pulverize the soil while being inverted, and to that end I employ such knives or fingers as may be required to cut or pulverize and invert the different soil.

In Figs. 16 and 17 the teeth have shanks 15, which are inserted in loops 17, and secured by means as shown in Fig. 16; but this construction may be varied without departing from the principle or sacrificing the advantages of my invention, the essential features of which are to utilize the side pressure required to invert the soil to pulverize the same, as shown and set forth.

H represents a colter-plow having a continuous cutting-edge, both in front, at $h$, and, at $h'$, upon the lower edge of the colter mold-board. As shown in Fig. 6, the colter-plow is provided with arms $h^2$, which are adjustably secured upon the land side of the share in such a manner as to allow the colter-plow to be given any elevation or pitch desired at will, according to the depth of the plow. As shown in Fig. 6, the arms $h^2$ operate in sockets $h^3$, and a set-screw secures them in any desired position at will. The share may be cut away sufficiently to allow the attachment and preserve the vertical plane for the edge, enough being cut away to compensate for the thickness of the shank of the colter.

In Fig. 1 the share of the plow is cut away to form a dovetailed recess, in which operates the flange $h^6$ of the colter-plow H, (shown in Fig. 9,) said flange being shaped to correspond with said recess and fit snugly therein. (See Fig. 1.) The colter-plow may thus be secured to the share or to the beam below the plane of the surface of the ground; but in any event the securing means will be sufficiently inward from the cutting-line of travel so as not to interfere with the landside or impede the progress. (See Figs. $9^x$ and 8.)

It will be observed that the mold-board in this invention may be elongated or shortened at will by the pulverizing devices 14, which of themselves may be adjusted to suit the exigencies of the occasion, as seen in Figs. 1, 10, 14, 16, 17, 26, and 27, and this mold-board may be thus adjustably elongated or shortened at will, even though the elongating portion be not provided with the fingers or teeth described, and that this portion of the invention is an important feature, as it allows the mold-board to accommodate itself to different depths of plowing and to proportionately govern the effective inversion of the soil.

As heretofore described, the beam, share, and colters are an entirety, and may be used in any proper manner and with any proper connections; but it is especially applicable and efficient in relation to a sulky, as will presently be described.

A single riding-wheel, X, having a colter or cutting-flange, $x$, is hung upon an axle, L, upon which is hung a vertical frame, C', in which is journaled a crank-shaft, C, as shown.

From the horizontal free portion of the crank-shaft C is loosely suspended a rectangular loop, B, to which the beam A is secured in any suitable manner.

Operating in the frame C' is a vertical rod, E, having collars $e$, so distanced in relation to each other and to the frame C' as to allow a spiral spring or its equivalent, $e'$, to be inserted between the collar and the frame, both above and below. The rod E is provided upon one side with ratchets E', (see Fig. 12,) and a locking-bar, F, having collar $f'$, operated by a pedal-lever, $f^2$, within convenient reach of the driver, is held with a constant force in such contact with the ratchet E' as to lock the plow-beam in any desired vertical position. While the locking-rod E E' is secured to the plow-beam, the springs $e'$ allow a vertical play to the beam, in cases of obstruction, to a limited extent.

The crank-shaft C is rigidly connected with a lever, $C^2$, within easy reach of the driver, by which the plow is raised or lowered at will, and to this lever $C^2$ is secured a lever, D, which is connected rigidly with a horizontal rock-shaft, D', carrying a bevel-gear, $d$, which meshes with a bevel-gear, $d'$, upon a vertical shaft, $d^2$, rigid with a frame, $d^3$, in which is journaled a shaft carrying pulverizing-disks $d^4$. These disks serve to pulverize the soil upon the plowed land, and by their incline when the plow is in operation to relieve the pressure upon the landside.

When the plow is elevated out of operation by means of the levers $C^2$ the bevel-gears, through the lever D and rock-shaft D', serve to turn the disks $d^4$ in the line of travel, for convenient transportation.

It will be observed that the greatest power from the crank-shaft and lever $C^2$ is exerted upon the plow when it is deepest in the soil, and when the greatest force is necessary, and that as the plow approaches the surface the speed of the elevating means is increased and the force proportionately diminished.

The cutting-flange $x$ of the riding-wheel X may be arranged upon either edge of the wheel, and the wheel is so arranged in relation to the cutting-edge of the plow that the said flange $x$ will not only mark a line of direction for the succeeding furrow, but it will act as a colter to sever the tenacious roots of the sod. This construction is shown in Fig. 11; but this single -flanged riding-wheel X may be brought into such juxtaposition to the plow as to efficiently cut the sod, as a colter approximately in front of the plow, by means of proper adjustability, as shown in Fig. 25 as a modification.

An adjustable frame, M, is secured to the frame C' by rods $m$, as shown in Fig. 10, and the harrow-disks $d^4$ may be concavo-convex in form, if desired, as shown in Fig. 11.

The dotted lines in Fig. 10 illustrate the plow-beam elevated and the braces $m$ at an angle. The draft being attached to the point $o$, it is evident that as the lock F is released (see Fig. 12) the draft will tend to pull the plow into the soil as soon as it touches, and that it will exert its greatest force as the plow is farthest from the direct line of draft, above or below. The plow is so positioned as to be most effective when the line of draft is in a horizontal plane, and if from obstructions or other cause the plow is forced up or down, the draft tends to limit such deflection and serves to bring the plow back to a normal position.

When it is not desired to harrow the ground the disks $d^4$ may be removed and any suitable riding means substituted. (See Fig. 25.)

The draft-connection is made at the point $o$ by ordinary clevis, single or double tree O, and it will be observed that the draft will serve to force the plow into the soil by reason of the horizontal line of draft being upon an approximate plane with the axle L, and also that the plow could not slide idly over the ground without overcoming the gravity of the entire apparatus.

I consider the mold-board of great importance in this invention, as it may be so graduated in length in relation to the depth of furrow as to insure the inversion of the soil, and thus consequently multiply and increase the effective capacity of the plow. For instance, the elongation of the mold-board will allow the plow to operate deeply in the furrow and still insure the inversion of the soil, and the shallow plowing to be similarly accommodated by shortening the same. This adjustment of the mold-board is made readily, and the elongating portion may be of any desired construction and applied by any suitable means, the gist of this part of the invention being to elongate or shorten the mold-board, so as to insure the inversion of the furrow at whatever depth the plow may be operated, the said plow being thus modified by any proper and efficient devices. To this end the elongating portion may be constructed to operate upon different kinds of soil and be removable at will, substituted, or replaced, as desired.

It is obvious that various modifications in details of construction may be made without departing from the principle of my invention or sacrificing the advantages thereof. For instance, the revolving colter $a^4$ may be swiveled, as shown in Fig. 5; the mold-board may be supplied with fingers, teeth, or the like, which are removable or adjustable at will; the colter-plow be attached in any proper manner to the land side of the share; the harrow-disks be operated, as described, either simultaneously with or by separate means from those which operate the plow, and the springs be arranged in any manner which will allow a proper play of the plow-beam without affecting either the carriage or plow independently.

Having thus fully described my invention, what I claim, and desire to secure by Letters Patent of the United States, is—

1. A mold-board having its rear portion cut away, as shown, to extend the length or curvature of the mold-board and more efficiently invert the furrow with the same or less amount of metal, forming fingers which also serve to pulverize or disintegrate the furrow with approximately the same draft-power, as specified.

2. A cut-away mold-board having holding-sockets and set-screws, or their equivalents, combined with cutting-knives secured thereto at any desired point of extension, and adapted to serve the double purpose of extending the curvature of the mold-board, to insure the turning of the furrow, and to cut the tenacious soil or sod, as specified.

3. A cut-away mold-board having holding means, and provided with independent teeth of concavo-convex form in transverse section, and each adjustably secured thereto by a set-screw or the like, as and for the purposes set forth.

4. The colter-plow H, having continuous cutting-edge $h$ $h'$ and arms $h^2$, combined with the sockets $h^3$ and set-screws $h^4$, said sockets and screws upon the land side in rear of the line of travel, as shown and set forth.

5. The plowshare A', cut away upon its forward surface at $a^7$, in combination with the jointer H, provided with dovetailed flange $h^6$, as and for the purposes specified.

6. In a sulky-plow, a riding or land wheel having a holding-flange, combined with adjustable harrow-disks, as and for the purposes set forth.

7. A sulky for plows having a single riding-wheel upon the land side and harrow-disks upon the furrow side, said disks being capable of being converted into transporting-wheels at will, as herein specified.

8. In a sulky-plow, the harrow-disks operated automatically to serve as pulverizers or transporting means as the plow is in or out of service, as specified.

9. A sulky-plow in combination with harrow-disks operated automatically to serve together in action, said disks serving as bearing-wheels when not in service, combined with operating means, substantially as set forth.

10. The combination of the plow A A' and harrow-disks $d^4$ $d^3$ with the crank-lever C $C^2$, lever D, rock-shaft D', and bevel-gears, or equivalent means for simultaneously placing the disks and plow in and out of operation, as set forth.

11. In a sulky-plow, the loose loop B, combined with the elbow-crank lever C, spring-rod F $f$, and rack-bar E E', and plow-beam A, as and for the purposes set forth.

12. In a sulky-plow, the combination of the wheel and plow-beam with the springs $e'$ $e'$, or their equivalents, upon the rod E, acting with a constant force in reverse directions to allow either the plow or wheel to ride over obstructions without disturbing the other or affecting the line of travel, as specified.

13. In a sulky-plow, the combination of the beam A and wheel with the bail B and the springs $b$ $b$, or their equivalents, acting in reverse horizontal directions to allow lateral play to the beam without disturbing the line of travel or affecting the wheel as the plow passes obstructions, as set forth.

14. In a sulky-plow, the combination of the beam A, wheel X $x$, bail B, and rod E with the springs $e'$ $b$, or their equivalents, as and for the purposes set forth.

15. The vertical ratcheted rod E, having collars $e$, combined with the frame C', the plow, the carriage, and the duplex springs, and with the means for regulating the depth of furrow, as specified.

16. The combination of the draft-bar M, or its equivalent, having suitable draft attachment, with the plow and the sulky-frame, by means of which construction the plow is forced into the soil by reason of the draft, as specified.

17. The combination of the braces $m$, connecting the draft mechanism M $o$ and the plow-beam, with the sulky-frame, whereby a vertical parallel relation between the said part $m$ and frame is always maintained, and the draft exerts a constant influence, both up and down, to hold the plow in its most operative position, as herein specified.

18. In a sulky-plow, the combination of the harrow-disks $d^4$ with the pulverizing-fingers upon the mold-board, each being so inclined from the plane of the line of travel that the side pressure of either will approximately counteract the opposite side pressure of the other, as herein specified.

19. A revolving colter swiveled to a frame or beam and held in contact with the soil by the constant force of a spring, in combination with the plow-beam, whereby lateral and vertical play is afforded to the colter, substantially as and for the purposes set forth.

20. In a plowshare, the dovetailed spaces 2, lip-spaces 1, and arms 3, combined with an intermediate point having corresponding connections, and the whole adapted to serve as and for the purposes set forth.

21. The share A', having spaces 1 2 and arms 3, dovetailed or otherwise, combined with an intermediate point, 4, and a toe-point, 7, and with connecting devices 5, 6, 8, 9, 10, and 11, and holding means 12, as and for the purposes set forth.

22. In a plow, a revolving colter, swiveled or jointed to the plow by compound joints, and provided with a spring, in combination with the plow-beam, whereby the colter will accommodate itself to the sweep of the plow in turning without wrenching the colter while in the ground, and will be held in constant contact with the soil by the force of the spring, as specified.

23. A lever, D, and connections D' d d', combined with lever C² and harrow-disks d⁴, and adapted to throw said disks into service as harrows or transporting means at will, as and for the purposes set forth.

24. The toe-point 7, having cut-away portions 8 and 10 and arm 9, with beveled edges, combined with a share or intermediate point having corresponding recess, substantially as shown and set forth.

25. The toe-point 7, having cut-away portions 8 10 and beveled arm 9, combined with the share A' or point 4, and with lateral set-screw 17, operating through loop or lugs 11, as and for the purposes set forth.

26. The combination of the frame C with the bail or loop B, suspended therefrom, and side springs, b, or their equivalents, and with the beam A, as and for the purposes set forth.

27. In a plow, a mold-board having sockets or other holding devices at its rear end, in combination with adjustable and removable extensions, as 14 Y, and susceptible of being elongated, contracted, or removed to insure the inversion of the furrow, whatever the depth, as specified.

28. The revolving colter, combined with the beam, and attached thereto by a compound swivel, as shown in Fig. 5, and for the purposes set forth.

29. In a sulky-plow, the bearing-wheel X, having flange $x$, adapted to serve as a colter to the furrow being turned, as a means for resisting side pressure, and as a riding means, as shown in Fig. 25, and also adapted to serve as a marker and colter for the succeeding furrow, a riding means, and a means for resisting side pressure while traversing the land, as shown in Fig. 24, substantially as herein set forth.

30. In combination with the plow-beam, the revolving colter, attached thereto by the compound swivel-joints $a'$ $a^2$, and provided with a spring or springs, substantially as shown and described.

31. The combination of the draft mechanism, the rod E, and springs with the beam A, whereby both the springs and draft serve to hold the plow in its most effective position by a constant force, and to return it thereto after displacement, as specified.

In testimony that I claim the foregoing as my own I have hereto affixed my signature in presence of two witnesses.

THOS. E. JEFFERSON.

Witnesses:
T. WALTER FOWLER,
H. CLAY SMITH.